J. R. BOUTELL.
ANTISCALD FAUCET.
APPLICATION FILED DEC. 26, 1912.

1,074,101.
Patented Sept. 30, 1913.
2 SHEETS—SHEET 1.

Witnesses:
Inventor:
John R. Boutell
By Elphant E. Young
Attorneys

UNITED STATES PATENT OFFICE.

JOHN R. BOUTELL, OF MILWAUKEE, WISCONSIN, ASSIGNOR OF ONE-HALF TO SIEBERS & RAISCH PATTERN WORKS, OF MILWAUKEE, WISCONSIN.

ANTISCALD-FAUCET.

1,074,101.  Specification of Letters Patent.  Patented Sept. 30, 1913.

Application filed December 26, 1912. Serial No. 738,725.

*To all whom it may concern:*

Be it known that I, JOHN R. BOUTELL, a citizen of the United States, and resident of Milwaukee, in the county of Milwaukee and State of Wisconsin, have invented certain new and useful Improvements in Antiscald-Faucets; and I do hereby declare that the following is a full, clear, and exact description thereof.
My invention refers to anti-scalding faucets, its object being to provide a simple, durable, economical and effective device of this type, the same being an improvement upon the structural features of an anti-scald faucet, the generic principles of which are embodied in an allowed application for patent filed by me May 28, 1912, Ser. No. 700,210, for improvements in anti-scald faucets.
With the above object in view the invention consists in certain peculiarities of construction and combination of parts as set forth hereinafter with reference to the accompanying drawings and subsequently claimed.

Figure 1:
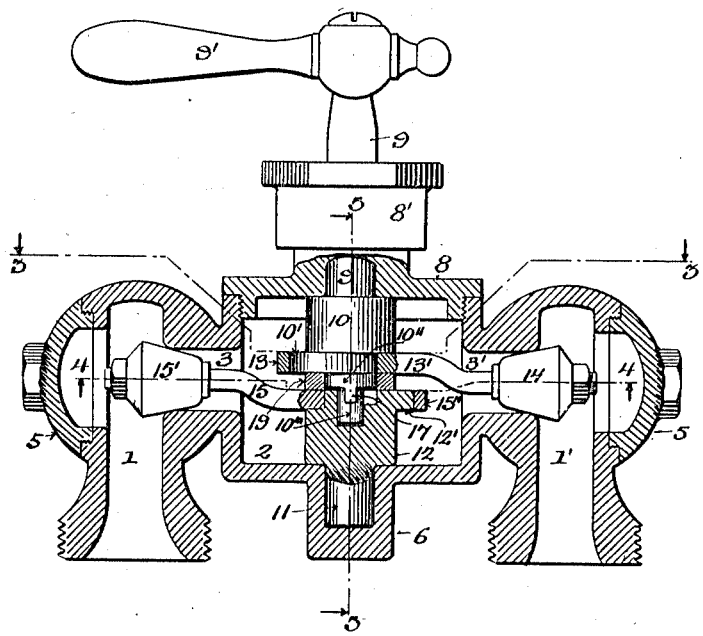
Figure 2:
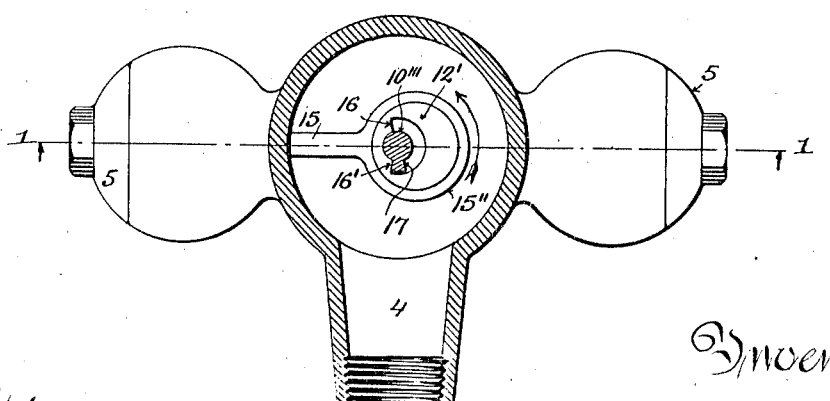
Figure 3:
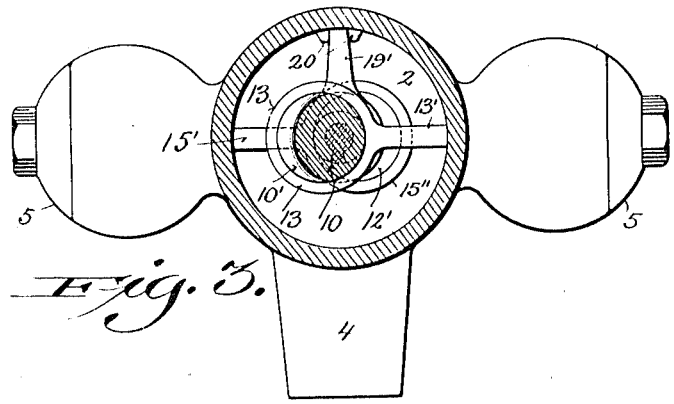
Figure 4:
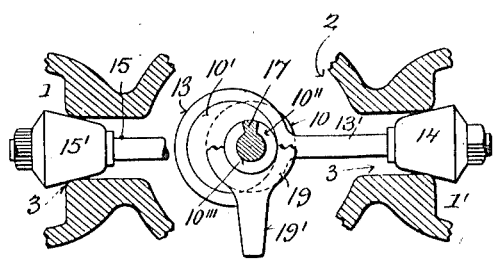
Figure 5:
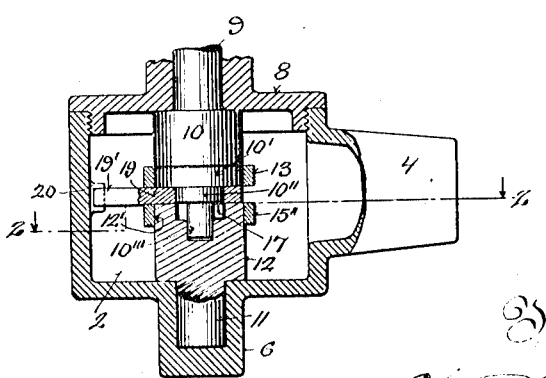

In the drawings Figure 1 represents a longitudinal central sectional elevation of a faucet embodying the features of my invention, the valves being shown in their closed positions; Fig. 2, a detailed plan sectional view of the operating mechanism, the section being indicated by line 2—2 looking in the direction of the arrow, Fig. 5; Fig. 3, a similar detailed plan sectional view taken upon a plane as indicated by line 3—3 of Fig. 1; Fig. 4, an inverted sectional plan view of the valve mechanism, the section being indicated by line 4—4 looking in the direction of the arrow, Fig. 1, and Fig. 5, a longitudinal sectional view, the section being indicated by line 5—5 of Fig. 1.

Referring by characters to the drawings, 1, 1', represent hot and cold water valve chambers respectively of a housing, which housing is provided with a central mixing chamber 2 that communicates with the valve chambers through hot and cold water ports chambers 3 and 3' respectively. The mixing chamber 2 is also provided with a discharge port 4 that is adapted to receive a suitable fitting. The valve chambers are each provided with open ends which are closed by caps 5 in threaded union with said ends. The bottom wall of the mixing chamber is provided with a projecting centrally disposed socket 6, the upper wall of the chamber being provided with an open mouth for the reception of a bonnet 8 that is in screw-threaded engagement therewith. The bonnet also carries the usual stuffing-box 8' for the reception of an operating spindle 9, which spindle projects through the stuffing-box and carries a handle 9'. That end of the spindle which projects into the mixing chamber is formed with a hub 10 that terminates with an eccentric 10' and below said eccentric the spindle has a stepped portion 10'' from which point the spindle terminates in a reduced stud 10'''. Projecting from the stepped portion 10'' of the spindle and the reduced stud portion thereof is a tappet-lug 17, the same comprising the means for actuating one of the valve members. A stud spindle 11 is journaled in the socket in axial alinement with the operating spindle, the said stud being provided with a hub 12 that terminates with an eccentric 12', the face of the same being upon a slightly lower plane than the face of the stepped portion 10'' of the actuating spindle. This eccentric, as best shown in Fig. 2, is recessed to form tappet-engaging shoulders 16, 16', the tappet 17 being adapted to project into the recessed portion of the eccentric for engagement therewith. The hub 12 below the recessed portion of the eccentric is also cored for the reception of the reduced shank 10''' of the operating spindle, whereby said operating spindle and lower eccentric member are held in alinement.

An apertured hub 13 of a valve-stem 13' is journaled upon the operating stem eccentric 10', the valve-stem being extended toward the cold-water supply port 3' and carries a ball-valve 14 that is adapted to control said cold-water supply-port. A similar valvestem 15 carrying a ball-valve 15' is fitted to the stud eccentric 12', the said stem being provided with an apertured hub 15'' that is adapted to receive the eccentric, the hubs of the stems constituting straps for their respective eccentrics.

In order to prevent binding between the hot and cold water eccentrics incidental to the operation of the device, I provide a spacing collar 19, which is fitted over the stepped portion 10'' of the operating stem, said collar being interposed between the eccentrics and also serving to prevent the hub 13 of the valve-stem 13' from displacement. This